US012682718B2

(12) United States Patent
Liu

(10) Patent No.: US 12,682,718 B2
(45) Date of Patent: Jul. 14, 2026

(54) ELECTRONIC DEVICE AND CURB SYSTEM HAVING THE SAME

(71) Applicant: Che-An Liu, Taichung City (TW)

(72) Inventor: Che-An Liu, Taichung City (TW)

( * ) Notice: Subject to any disclaimer, the term of this patent is extended or adjusted under 35 U.S.C. 154(b) by 363 days.

(21) Appl. No.: 18/593,080

(22) Filed: Mar. 1, 2024

(65) Prior Publication Data

US 2024/0296709 A1    Sep. 5, 2024

(30) Foreign Application Priority Data

Mar. 3, 2023    (TW) ................................. 112107871
Oct. 18, 2023    (TW) ................................. 112139772

(51) Int. Cl.
*G07F 17/24*    (2006.01)
*H04N 23/57*    (2023.01)
*E01C 11/22*    (2006.01)

(52) U.S. Cl.
CPC ........... *G07F 17/248* (2013.01); *H04N 23/57* (2023.01); *E01C 11/221* (2013.01)

(58) Field of Classification Search
CPC .... E01C 11/221; E01C 11/222; E01C 11/223; G07F 17/248; G03B 17/08; G03B 29/00; H04N 23/57
USPC ............................................................ 404/7
See application file for complete search history.

(56) References Cited

U.S. PATENT DOCUMENTS

| | | | | |
|---|---|---|---|---|
| 9,697,506 | B2 * | 7/2017 | Jones ........................ | G07C 1/30 |
| 2008/0030373 | A1 * | 2/2008 | Montgomery ........... | G08G 1/14 |
| | | | | 705/13 |
| 2025/0365874 | A1 * | 11/2025 | Liu ........................ | E01C 11/222 |
| 2026/0085509 | A1 * | 3/2026 | Liu ........................... | E03F 1/00 |

FOREIGN PATENT DOCUMENTS

| | | | | | |
|---|---|---|---|---|---|
| CN | 120223991 | A | * | 6/2025 | ............. H04N 23/57 |
| EP | 4527195 | A1 | * | 3/2025 | ............. E01C 11/222 |

* cited by examiner

*Primary Examiner* — Gary S Hartmann
(74) *Attorney, Agent, or Firm* — Burris Law, PLLC

(57) ABSTRACT

An electronic device includes a housing and a drainage structure. The drainage structure includes a shoulder surrounding wall connected to a top end of the housing, and an outer surrounding wall extending from the shoulder surrounding wall. The shoulder surrounding wall has opposite rear and front end portions, and is inclined with the front end portion lower than the rear end portion. The housing defines a receiving space and has a front housing wall that has a first slanted wall portion formed with an image-capturing opening. An angle is formed between a central line normal to the first slanted wall portion and extending through the image-capturing opening and a reference line, and is smaller than 90 degrees. A top cover unit closes the receiving space. An image-capturing module is disposed in the receiving space.

20 Claims, 17 Drawing Sheets

100

10

11(14)

40

44

IX

IX

343(341)

343(341)

20(30)

142

ELECTRONIC DEVICE AND CURB SYSTEM HAVING THE SAME

CROSS-REFERENCE TO RELATED APPLICATION

This application claims priorities to Taiwanese Patent Application No. 112107871, filed on Mar. 3, 2023, and Taiwanese Patent Application No. 112139772, filed on Oct. 18, 2023, the entire disclosure of which is incorporated by reference herein.

FIELD

The disclosure relates to an electronic device, and more particularly to an electronic device adapted for mounting to a curb system, and a curb system having the same.

BACKGROUND

A curb is generally disposed between a sidewalk and a roadway to prevent foreign objects from moving to the roadway so as to reduce traffic accidents.

Nowadays, with development of smart parking lots, a smart parking meter is used to detect and identify a vehicle and a license plate of the vehicle.

As shown in FIG. 1, a parking meter 2 is mounted to a curb 1. The parking meter 2 includes an L-shaped frame body 201 that is fixed to a top surface and a front surface of the curb 1, a solar panel module 202 that is mounted to a top surface of the L-shaped frame body 201, and an image-capturing module 203 that is disposed in the L-shaped frame body 201. The image-capturing module 203 has a lens 204 oriented toward a parking space 3.

The image-capturing module 203 of the parking meter 2 may record and identify a vehicle license of a vehicle 4 parked in the parking space 3 so that a parking time and a parking fee of the vehicle 4 can be computed by a cloud system. However, the parking meter 2 protrudes outwardly relative to the top surface and the front surface of the curb 1. When the vehicle 4 is pulled into or pulled out of the parking space 3, the parking meter 2 may be accidentally hit by the vehicle 4, causing damage of the parking meter 2 and the vehicle 4. In addition, the parking meter 2 protruding relative to the top surface and the front surface of the curb 1 may adversely affect pedestrian safety.

SUMMARY

Therefore, an object of the disclosure is to provide an electronic device that can alleviate at least one of the drawbacks of the prior art.

Accordingly, the electronic device includes a control unit, a top cover unit, and an image-capturing module.

The control unit includes a housing and a drainage structure. The drainage structure has opposite rear and front ends that are arranged in a front-rear direction. The drainage structure includes a shoulder surrounding wall that is connected to a top end of the housing, and an outer surrounding wall that extends upwardly from the shoulder surrounding wall. The shoulder surrounding wall has opposite rear and front end portions that are disposed respectively at the rear and front ends of the drainage structure, and is inclined with the front end portion lower than the rear end portion. The outer surrounding wall has two side wall portions that are opposite to each other in a left-right direction perpendicular to the front-rear direction, and a rear wall portion that is disposed at the rear end of the drainage structure and that interconnects the side wall portions. The housing defines a receiving space and has a front housing wall that is disposed forwardly of the receiving space in the front-rear direction, and that has a first slanted wall portion formed with an image-capturing opening. An angle is formed between a central line that is normal to the first slanted wall portion and that extends through the image-capturing opening and a reference line that extends in the left-right direction, and is smaller than 90 degrees.

The top cover unit is removably connected to the control unit and closes the receiving space.

The image-capturing module is disposed in the receiving space, and has a lens that is oriented to the image-capturing opening.

Another object of the disclosure is to provide a curb system that includes the abovementioned electronic device and a curb base unit.

The curb base unit has a top base surface, a bottom base surface, a front base surface, a rear base surface, two side base surfaces, and a mounting space. The top base surface and the bottom base surface are opposite to each other. The front base surface and the rear base surface are opposite to each other. The side base surfaces are spaced apart from each other in the left-right direction. The mounting space is defined by the top base surface and has a front opening and a top opening.

The electronic device is mounted in the mounting space.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
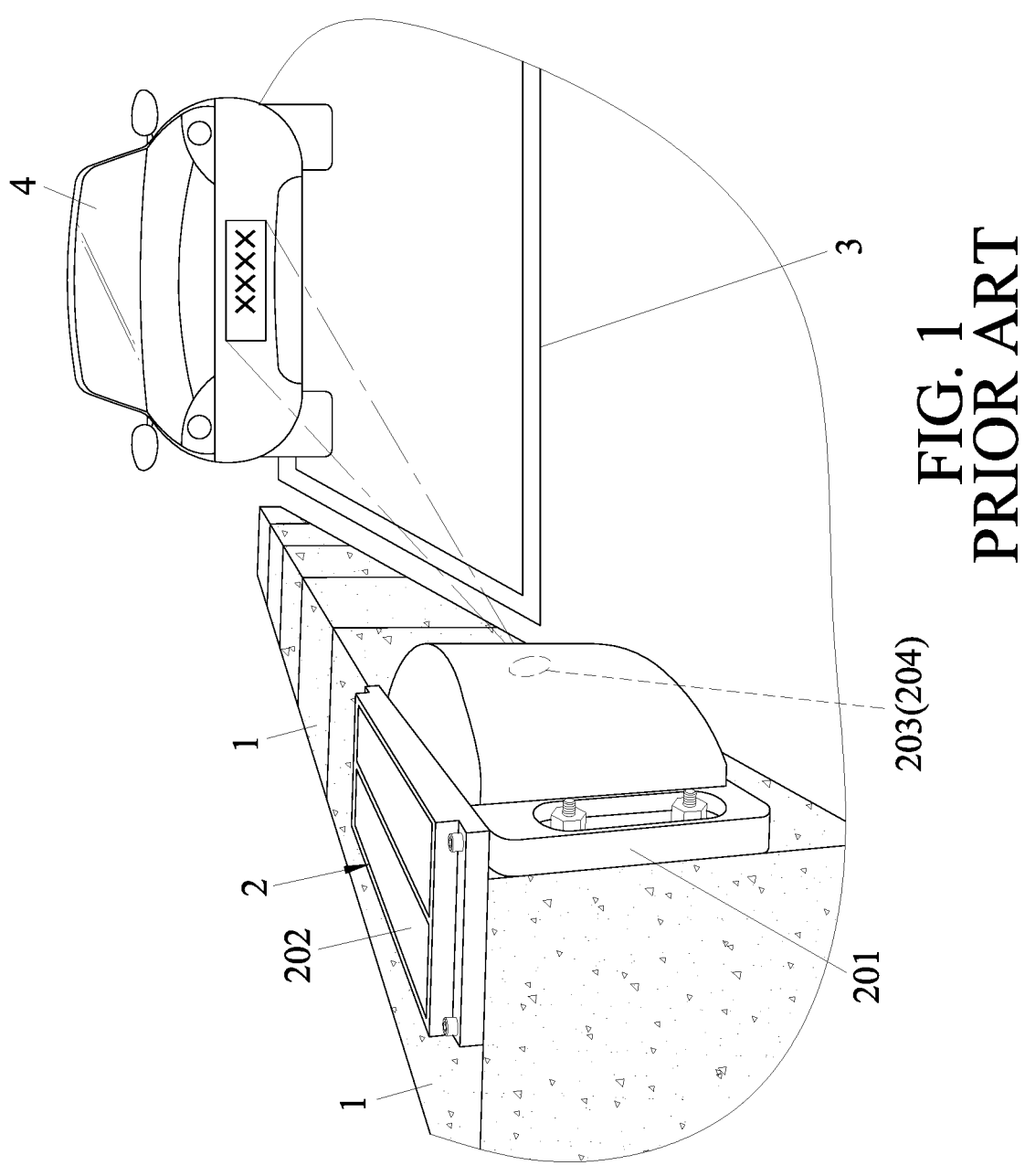
FIG. 1 is a fragmentary perspective view illustrating a conventional parking system.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
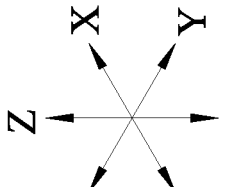
FIG. 2 is a perspective view illustrating an electronic device mounted to a curb base unit of a curb system according to an embodiment of the disclosure.
Figure 3:
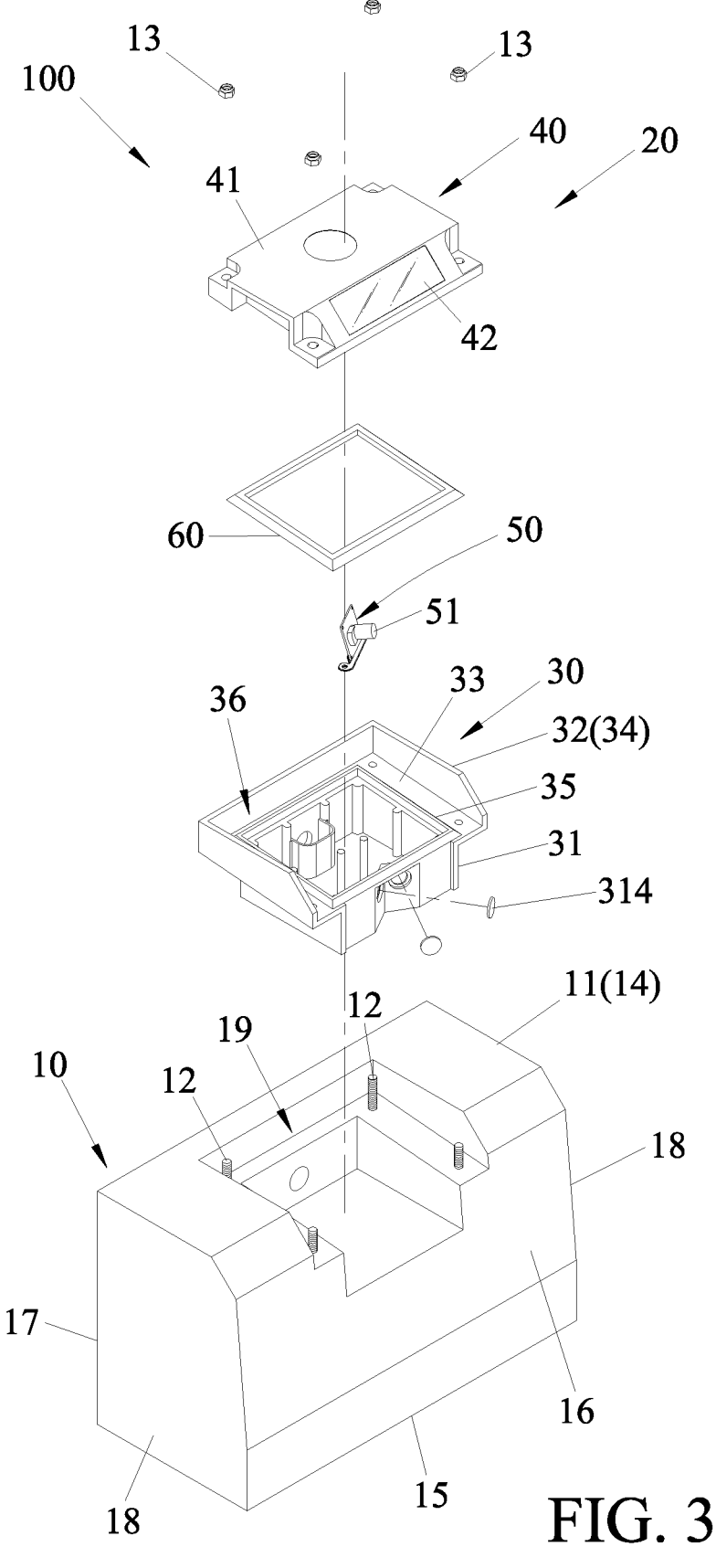
FIG. 3 is an exploded perspective view of the embodiment illustrating the electronic device and the curb base unit.

Referring to FIGS. 2 and 3, a curb system 100 according to a first embodiment of the disclosure includes an electronic device 20 and a curb base unit 10.

Figure 4:
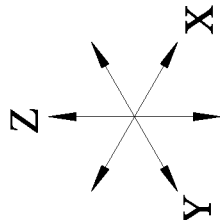
FIG. 4 is a perspective view of the embodiment illustrating the curb base unit.
Figure 7:
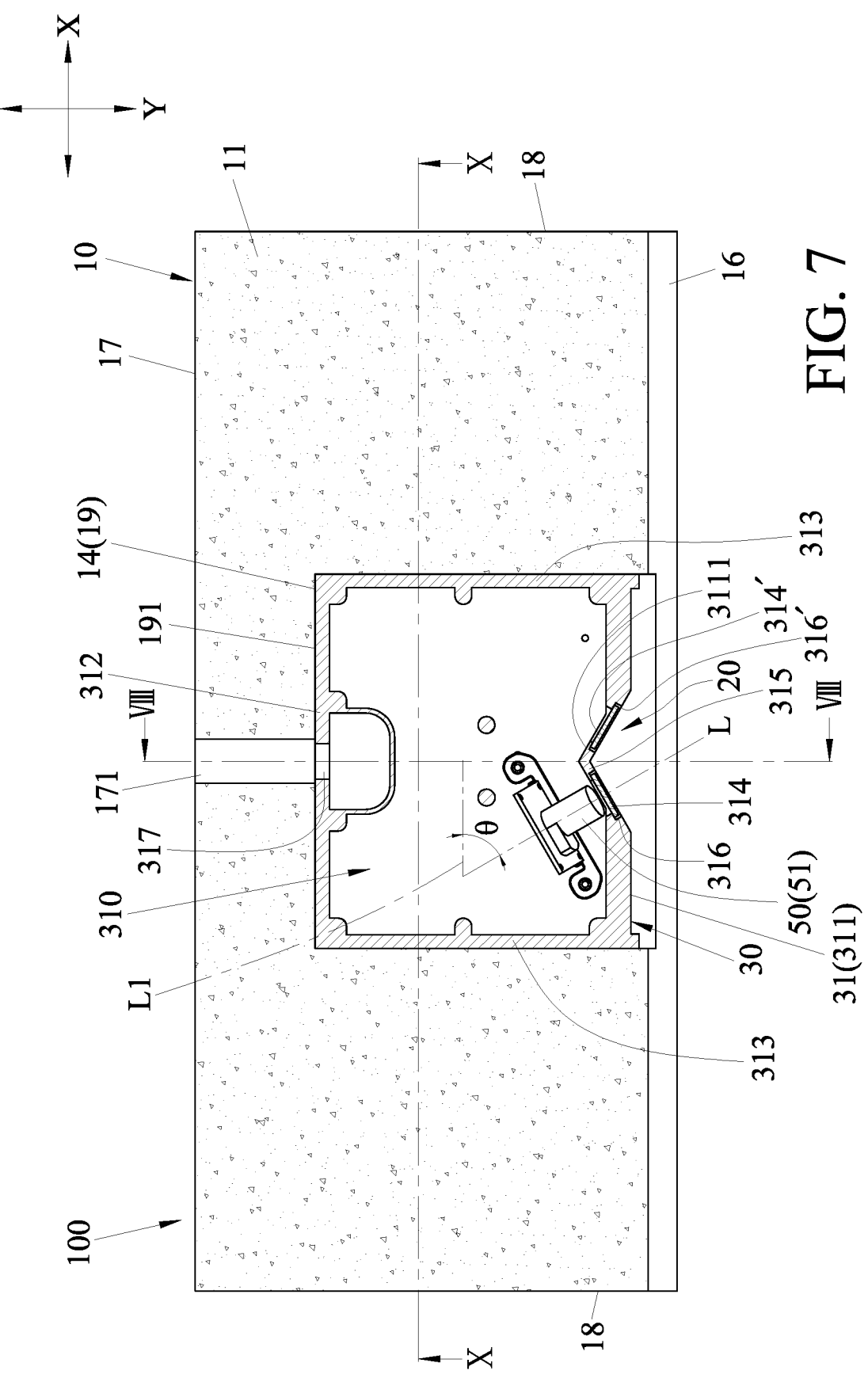
FIG. 7 is a top sectional view illustrating the curb system of the embodiment.
Figure 8:
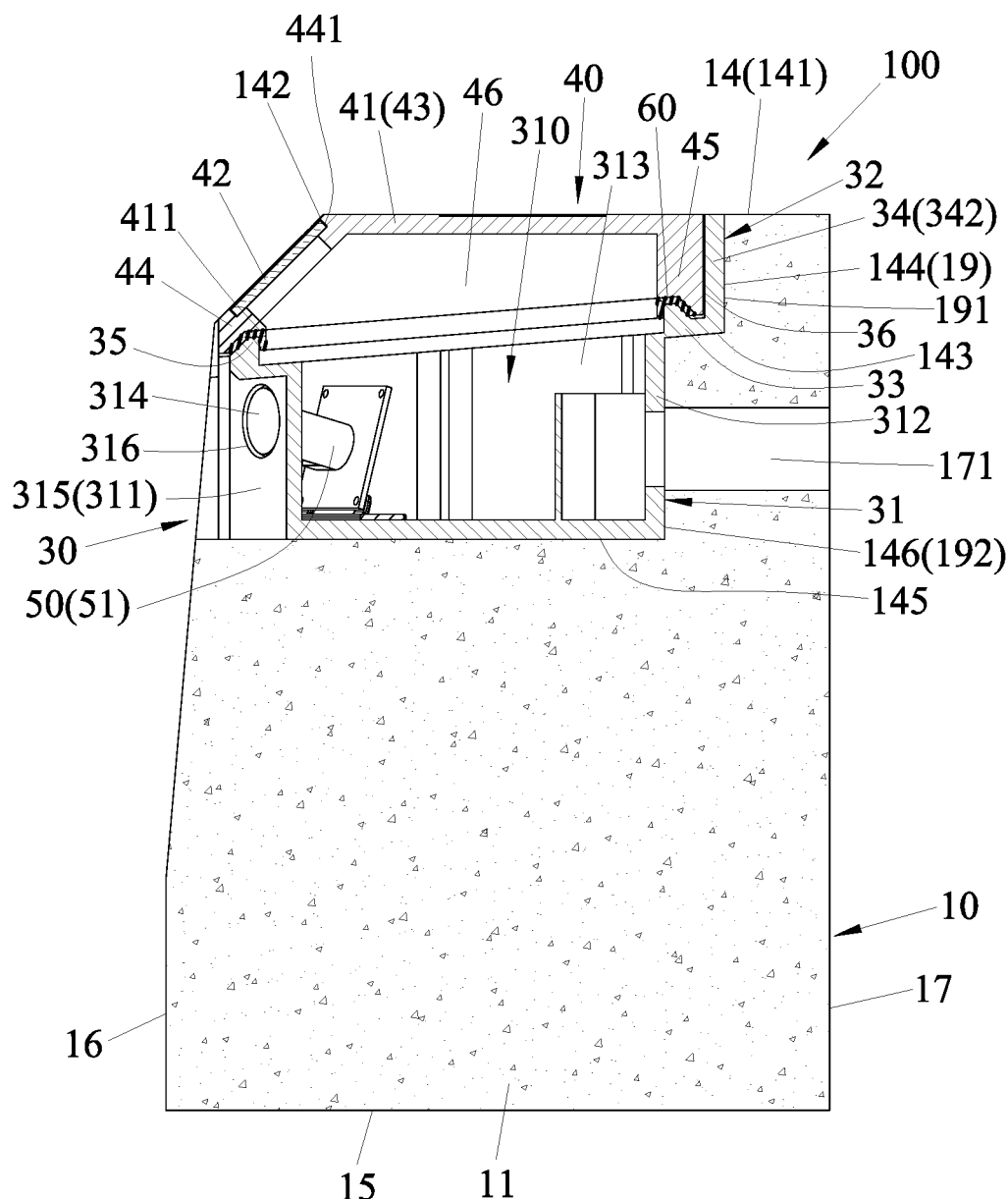
FIG. 8 is a side sectional view taken along line VIII-VIII from FIG. 7.

Referring to FIGS. 4, 7, and 8, the curb base unit 10 includes a main seat body 11, four bolts 12, and four nuts 13. In this embodiment, the main seat body 11 is made of concrete.

The main seat body 11 has a top base surface 14, a bottom base surface 15, a front base surface 16, a rear base surface 17, two side base surfaces 18, and a mounting space 19. The top base surface 14 and the bottom base surface 15 are opposite to each other in a top-bottom direction (Z). The front base surface 16 and the rear base surface 17 are opposite to each other in a front-rear direction (Y) perpendicular to the top-bottom direction (Z). The side base surfaces 18 are spaced apart from each other in a left-right direction (X) perpendicular to the top-bottom direction (Z) and the front-rear direction (Y). The mounting space 19 is defined by the top base surface 14 and has a front opening and a top opening. In this embodiment, the mounting space 19 has a first mounting region 191 and a second mounting region 192 communicating with the first mounting region 191. The second mounting region 192 is disposed under the first mounting region 191.

The top base surface 14 has a shoulder portion 143, a first surrounding neck portion 144, a mounting end portion 145, and a second surrounding neck portion 146. The shoulder portion 143 serves as a bottom boundary of the first mounting region 191. The first surrounding neck portion 144 extends upwardly from the shoulder portion 143 and serves as a lateral boundary of the first mounting region 191. The mounting end portion 145 serves as a bottom boundary of the second mounting region 192. The second surrounding neck portion 146 interconnects the shoulder portion 143 and the mounting end portion 145, and serves as a lateral boundary of the second mounting region 192. The shoulder portion 143, the first surrounding neck portion 144, the mounting end portion 145, and the second surrounding neck portion 146 are connected to the front base surface 16.

In this embodiment, the top base surface 14 further has a flat portion 141 and an inclined portion 142. The flat portion 141 is connected to the rear base surface 17 and a top end of the first surrounding neck portion 144. The inclined portion 142 is connected between the flat portion 141 and the front base surface 16, and has a rear end and a front end opposite to and lower than the rear end. The shoulder portion 143 has opposite rear and front end sections, and is inclined with the front end section lower than the rear end section thereof. The shoulder portion 143 surrounds a top open end of the second mounting region 192.

The four bolts 12 are spaced apart from each other, and are disposed on the shoulder portion 143.

The rear base surface 17 is formed with a first pipeline hole 171 that extends through and communicates with the second mounting region 192.

Figure 5:
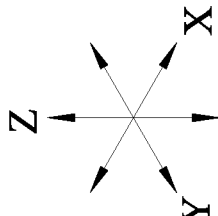
FIG. 5 is a perspective view of the embodiment illustrating a control unit of the electronic device.

As shown in FIGS. 3, 5, and 7, the electronic device 20 is mounted in the mounting space 19, and includes a control unit 30, a top cover unit 40, an image-capturing module 50, and a sealing ring 60.

As shown in FIGS. 5, 7, and 8, the control unit 30 includes a housing 31 and a drainage structure 32. The housing 31 and the drainage structure 32 are made of a metal material.

In this embodiment, the housing 31 is disposed in the second mounting region 192 and defines a receiving space 310. The housing 31 has a front housing wall 311, a rear housing wall 312, and two side housing walls 313.

The front housing wall 311 is disposed forwardly of the receiving space 310 in the front-rear direction (Y), and has a first slanted wall portion 315 formed with an image-capturing opening 316. An angle (θ) is formed between a central line (L) that is normal to the first slanted wall portion 315 and that extends through the image-capturing opening 316 and a reference line (L1) that extends in the left-right direction (X), and is smaller than 90 degrees. A transparent plate 314 is disposed in and closes the image-capturing opening 316.

The rear housing wall 312 is opposite to the front housing wall 311 in the front-rear direction (Y), and is formed with a second pipeline hole 317 that communicates with the receiving space 310 and that is aligned with the first pipeline hole 171. The first pipeline hole 171 and the second pipeline hole 317 cooperatively allow insertions of internet cables (not shown) or electric wires (not shown).

The two side housing walls 313 are spaced apart from each other in the left-right direction (X) and interconnect the front housing wall 311 and the rear housing wall 312.

The drainage structure 32 has opposite rear and front ends that are arranged in the front-rear direction (Y). The drainage structure 32 is disposed in the first mounting region 191, and includes a shoulder surrounding wall 33, an outer surrounding wall 34, and a protrusion 35.

Figure 9:
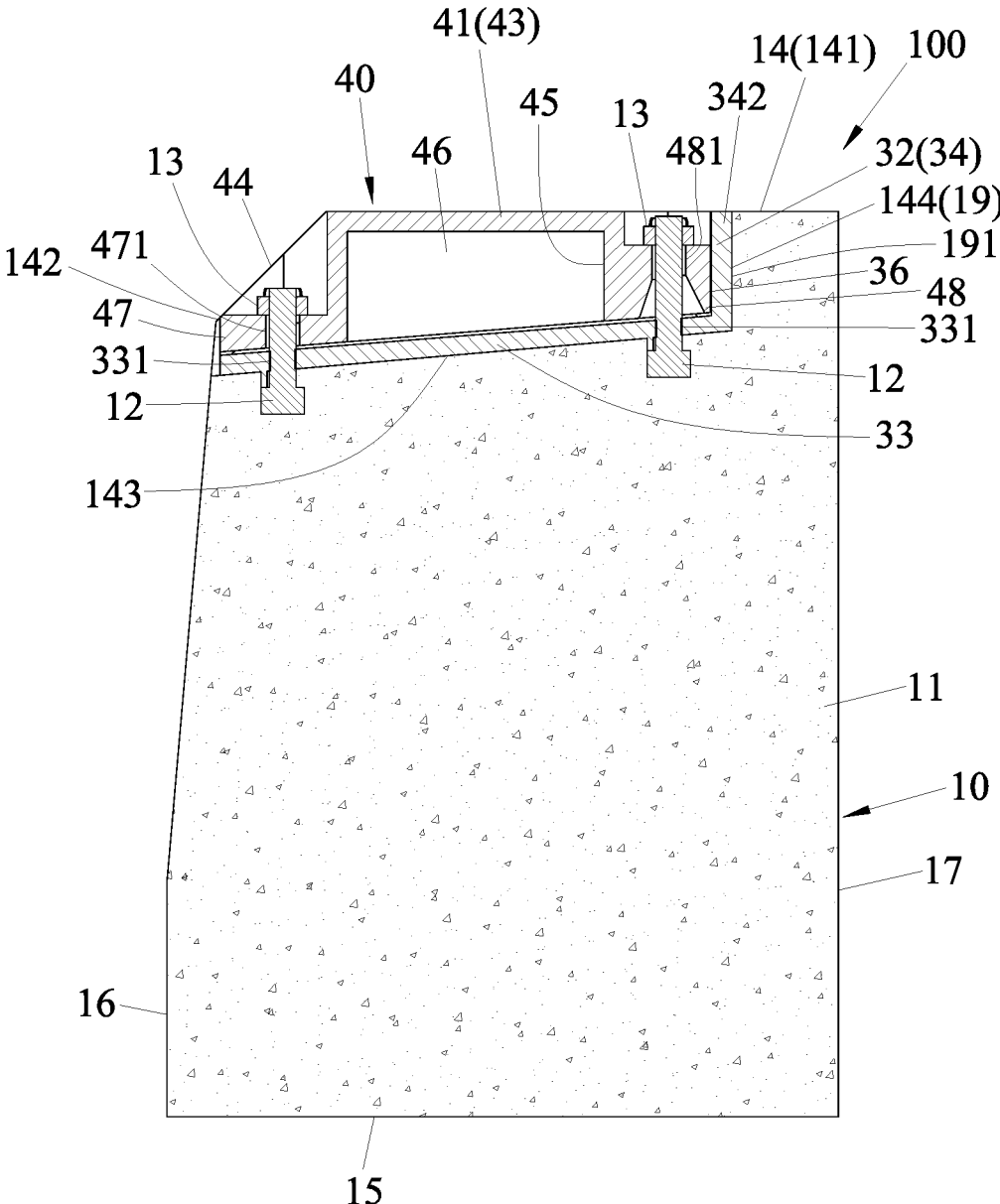
FIG. 9 is a side sectional view taken along line IX-IX from FIG. 2.

As shown in FIGS. 5, 8, and 9, the shoulder surrounding wall 33 is connected to a top end of the housing 31, projects transversely and outwardly from the top end of the housing 31, and is formed with four bolt holes 331. In this embodiment, the shoulder surrounding wall 33 has opposite rear and front end portions that are disposed respectively at the rear and front ends of the drainage structure 32, and is inclined with the front end portion lower than the rear end portion. An inclined angle of the shoulder portion 143 of the main seat body 11 conforms to an inclined angle of the shoulder surrounding wall 33, so the shoulder surrounding wall 33 abuts against the shoulder portion 143 of the main seat body 11.

The outer surrounding wall 34 extends upwardly from an outer periphery of the shoulder surrounding wall 33. The outer surrounding wall 34 has two side wall portions 341 that are opposite to each other in the left-right direction (X), and a rear wall portion 342 that is disposed at the rear end of the drainage structure 32 and that interconnects the side wall portions 341.

Referring back to FIGS. 2 and 5, each of the side wall portions 341 has a front inclined end surface 343 that has a rear end and a front end that is opposite to and lower than the rear end. An inclined angle of the front inclined end surface 343 of each of the side wall portions 341 conforms to an inclined angle of the inclined portion 142 of the top base surface 14 of the main seat body 11, so inclinations of the front inclined end surfaces 343 of the side wall portions 341 and the inclined portion 142 may effectively prevent a foreign object (e.g., a pedestrian or a vehicle) from being accidentally hit.

The protrusion 35 protrudes upwardly from the front housing wall 311 and the shoulder surrounding wall 33, and surrounds the receiving space 310 of the housing 31.

In this embodiment, the shoulder surrounding wall 33 and the outer surrounding wall 34 cooperatively define an accommodating space 36 that has a top open end and a front open end, and that communicates with the receiving space 310.

Figure 6:
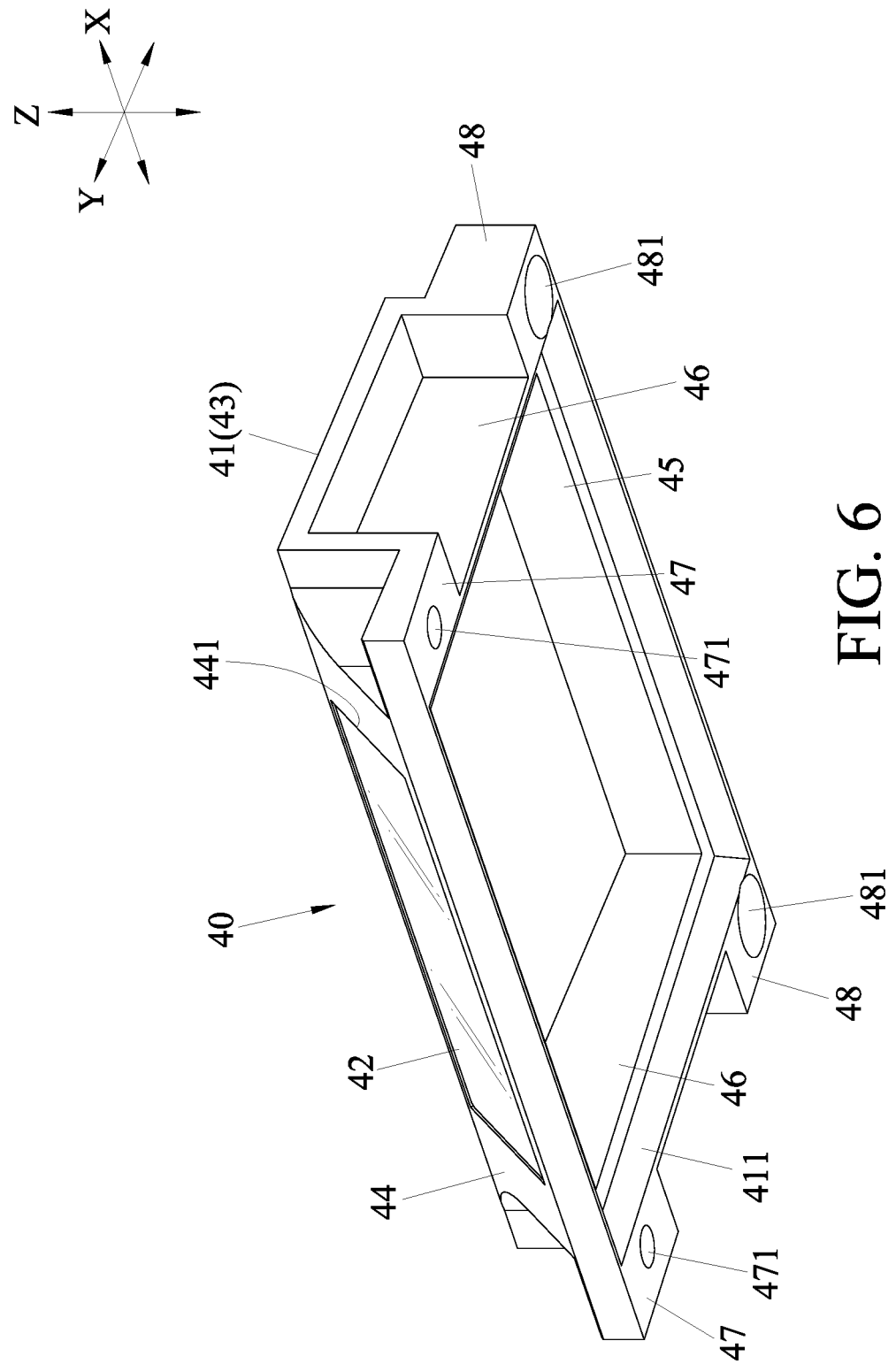
FIG. 6 is a perspective view of the embodiment illustrating a top cover unit of the electronic device.

As shown in FIGS. 3, 5, and 6, the top cover unit 40 is removably connected to the control unit 30 and closes the receiving space 310. In this embodiment, the top cover unit 40 is removably disposed in the accommodating space 36 of the drainage structure 32, and includes a cover body 41 and a display 42.

The cover body 41 is made of a metal material, and includes a top cover wall 43, a front cover inclined wall 44, a rear cover wall 45, two side cover walls 46, two front fixing blocks 47, and two rear fixing blocks 48. In addition, the cover body 41 has a recess 411 that is indented upwardly from a bottom end thereof and that is conformed in shape to the protrusion 35.

The front cover inclined wall 44 extends obliquely, forwardly, and downwardly from the top cover wall 43, and is formed with a retaining space 441. As shown in FIG. 2, an inclination of the front cover inclined wall 44 conforms to an inclination of the front inclined end surface 343 of each of the side wall portions 341.

The rear cover wall 45 is connected to the top cover wall 43 and is opposite to the front cover inclined wall 44.

The two side cover walls 46 are connected to the top cover wall 43, the front cover inclined wall 44, and the rear cover wall 45, and are spaced apart from each other in the left-right direction (X).

The two front fixing blocks 47 are respectively connected to opposite lateral sides of the front cover inclined wall 44 and are respectively connected to front ends of the side cover walls 46. Each of the two front fixing blocks 47 has a front through hole 471.

The two rear fixing blocks 48 are respectively connected to opposite lateral sides of the rear cover wall 45 and are respectively connected to rear ends of the side cover walls 46. Each of the two rear fixing blocks 48 has a rear through hole 481.

The display 42 is disposed in the retaining space 441 and is flush with the front cover inclined wall 44. The display 42 may display parking information such as a vehicle license number, a parking time, parking fees, a payment barcode, etc. In addition, the display 42 may be omitted and replaced by a transparent glass plate, so a lighting device (not shown) may be included in the housing 31 of the control unit 30 and emits light serving as a warning signal.

As shown in FIG. 9 in combination with FIGS. 2 to 6, the four bolts 12 extend respectively through the bolt holes 331 of the shoulder surrounding wall 33 of the electronic device 20 and respectively through the front through holes 471 and the rear through holes 481. The four nuts 13 are respectively and threadedly connected to the bolts 12 and abut against the front fixing blocks 47 and the rear fixing blocks 48.

Figure 11:
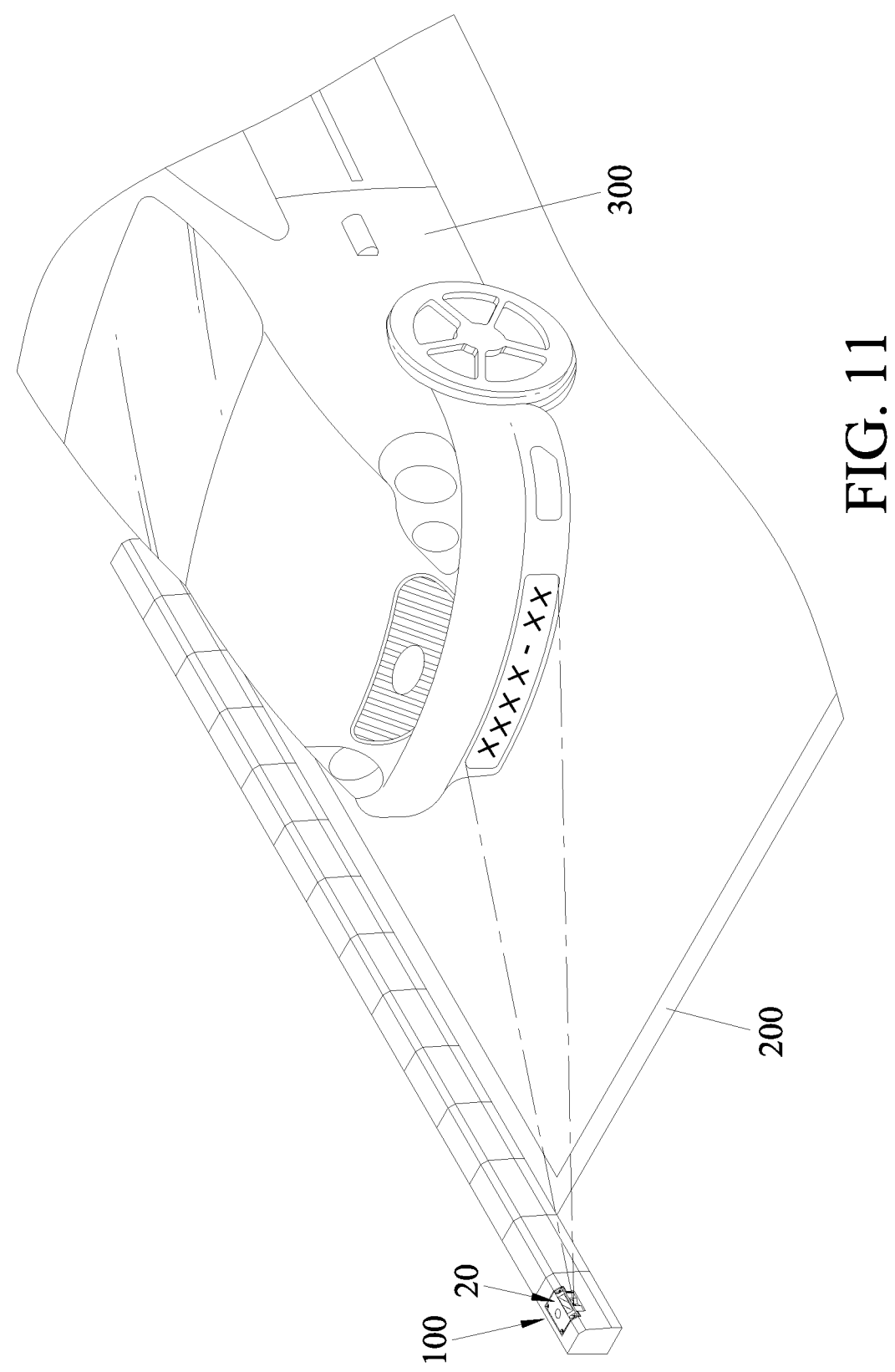
FIG. 11 is a fragmentary perspective view illustrating a vehicle parked in a parking spot and detected by the curb system of the disclosure.

As shown in FIG. 7, the image-capturing module 50 is disposed in the receiving space 310, and has a lens 51 that is oriented to the image-capturing opening 316. In addition, a detecting member (not shown) may be disposed in the receiving space 310. In this embodiment, the front housing wall 311 further has a second slanted wall portion 3111 that is connected to the first slanted wall portion 315. The second slanted wall portion 3111 is formed with an image-capturing opening 316' covered by a transparent plate 314'. As a result, the image-capturing module 50 may be selectively disposed in the receiving space 310 such that the lens 51 may be oriented to the image-capturing opening 316' of the second slanted wall portion 3111 and the transparent plate 314'. As shown in FIGS. 7 and 11, the lens 51 of the image-capturing module 50 may capture a vehicle license plate of a vehicle 300 parked in a parking spot 200 so that a vehicle license plate number of the vehicle 300 may be identified and a parking time and parking fees of the vehicle 300 can be computed by a cloud system.

As shown in FIG. 8 in combination with FIG. 3, the sealing ring 60 is sandwiched between the recess 411 and the protrusion 35 so as to enhance waterproof and dustproof effects.

The curb system 100 of the disclosure has following advantages.

(1) Because the electronic device 20 is mounted in the mounting space 19 of the main seat body 11 without protruding outside the main seat body 11, in comparison with the prior art, the pedestrian or the vehicle may not hit the electronic device 20 so as to effectively prevent the pedestrian, the vehicle, and the electronic device 20 from being damaged.

Figure 10:
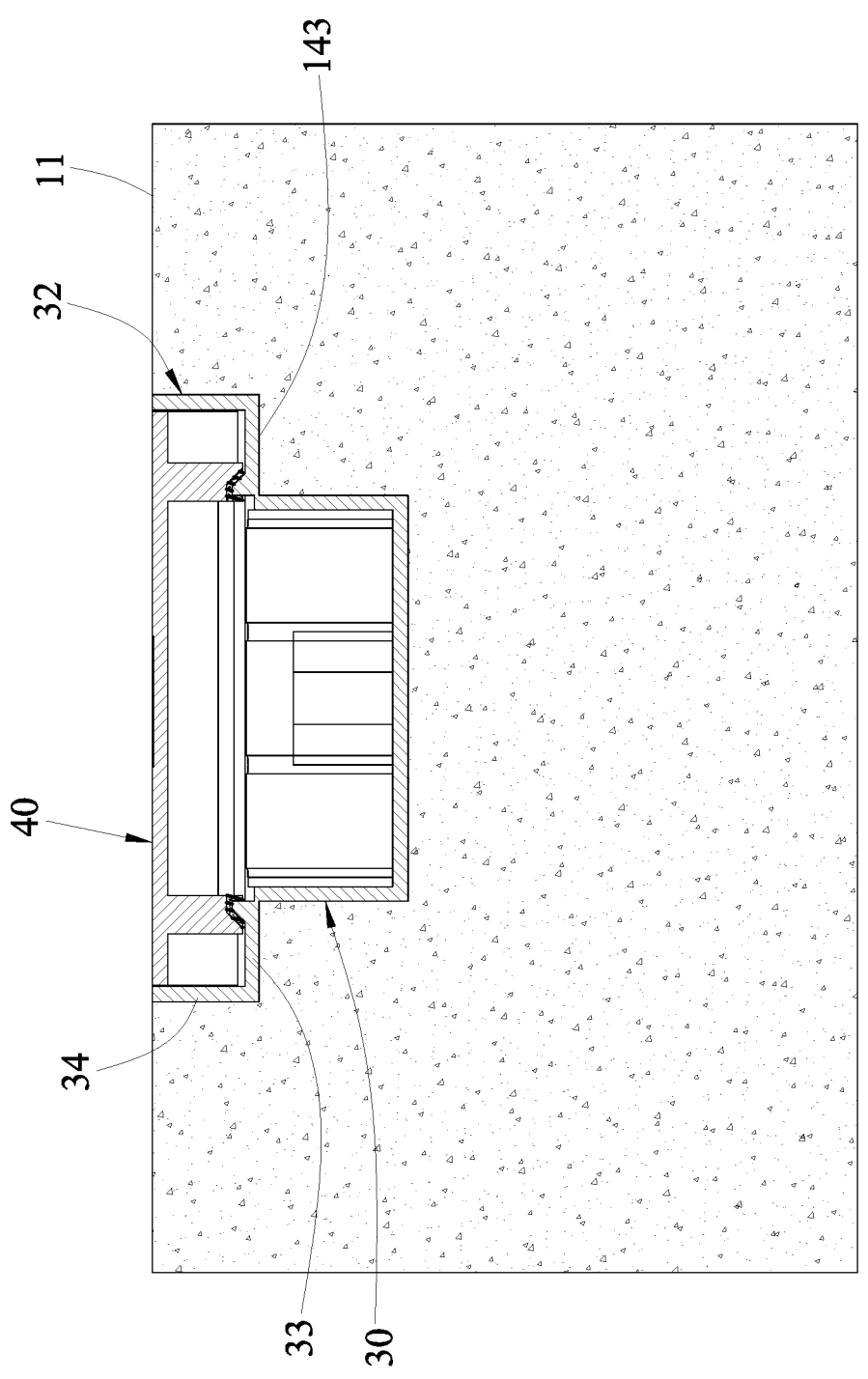
FIG. 10 is a front sectional view taken along line X-X from FIG. 7.

(2) The front open end of the accommodating space 36 defined by the shoulder surrounding wall 33 and the outer surrounding wall 34 may serve as a water-discharging opening. Because the inclined angle of the shoulder portion 143 and the inclined angle of the shoulder surrounding wall 33 conform to each other, a water-discharging effect may be enhanced. As a result, in a rainy day, when rain water flows through a gap between the drainage structure 32 and the top cover unit 40 (see FIG. 10), by virtue of an inclination of the shoulder surrounding wall 33, the rain water may be quickly discharged from the drainage structure 32.

(3) The first slanted wall portion 315 of the front housing wall 311 slants rearwardly toward the rear housing wall 312 and is covered by the top cover unit 40. As a result, the transparent plate 314 and the image-capturing opening 316 are effectively shielded by the top cover unit 40 from the rain water, thereby preventing the rain water from adversely affecting an image-capturing effect of the image-capturing module 50.

(4) Because the inclination of the front cover inclined wall 44 of the top cover unit 40 conforms to the inclination of the front inclined end surface 343 of each of the side wall portions 341 of the drainage structure 32, and because the front cover inclined wall 44 extends obliquely, forwardly, and downwardly from the top cover wall 43, the rain water on the top cover wall 43 may be effectively guided by the front cover inclined wall 44 to leave the drainage structure 32.

(5) As long as the nuts 13 are tightened, the electronic device 20 is fixedly disposed in the mounting space 19 of the main seat body 11. On the contrary, as long as the nuts 13 are loosened and removed respectively from the bolts 12, the top cover unit 40 can be immediately removed from the control unit 30 so that electronic components (not shown) in the control unit 30 can be repaired or replaced, thereby increasing convenience of installation and maintenance of the curb system 100.

(6) The waterproof and dustproof effects on the control unit 30 may be effectively enhanced by the sealing ring 60 sandwiched between the control unit 30 and the top cover unit 40.

It should be noted that, when the display 42 is omitted, the top cover unit 40 may be in different shapes to conform to different shapes of the curb system 100 so that the overall appearance of the curb system 100 may remain consistent.

Figure 12:
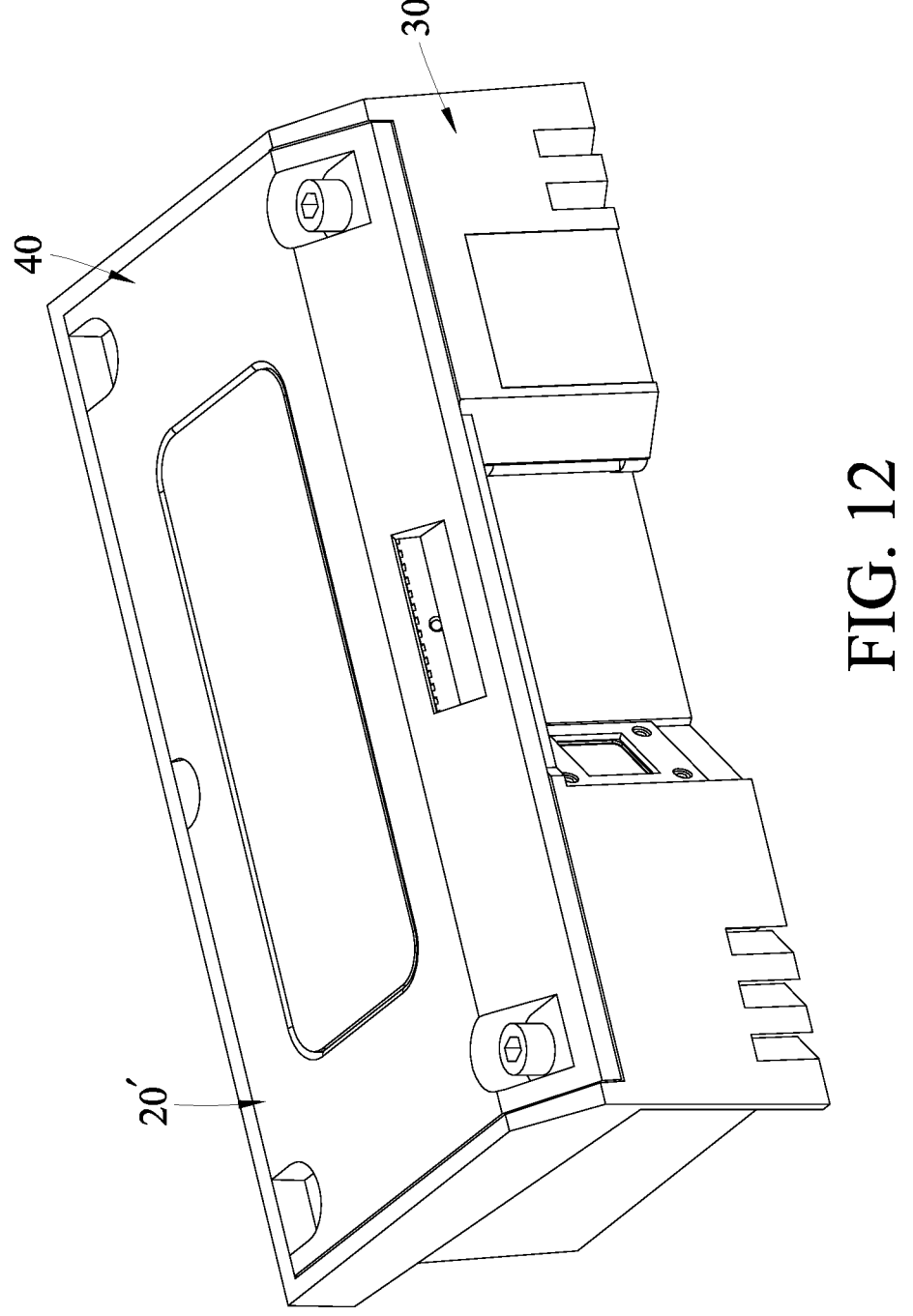
FIG. 12 is a perspective view illustrating an electronic device of a curb system according to a second embodiment of the disclosure.
Figure 13:
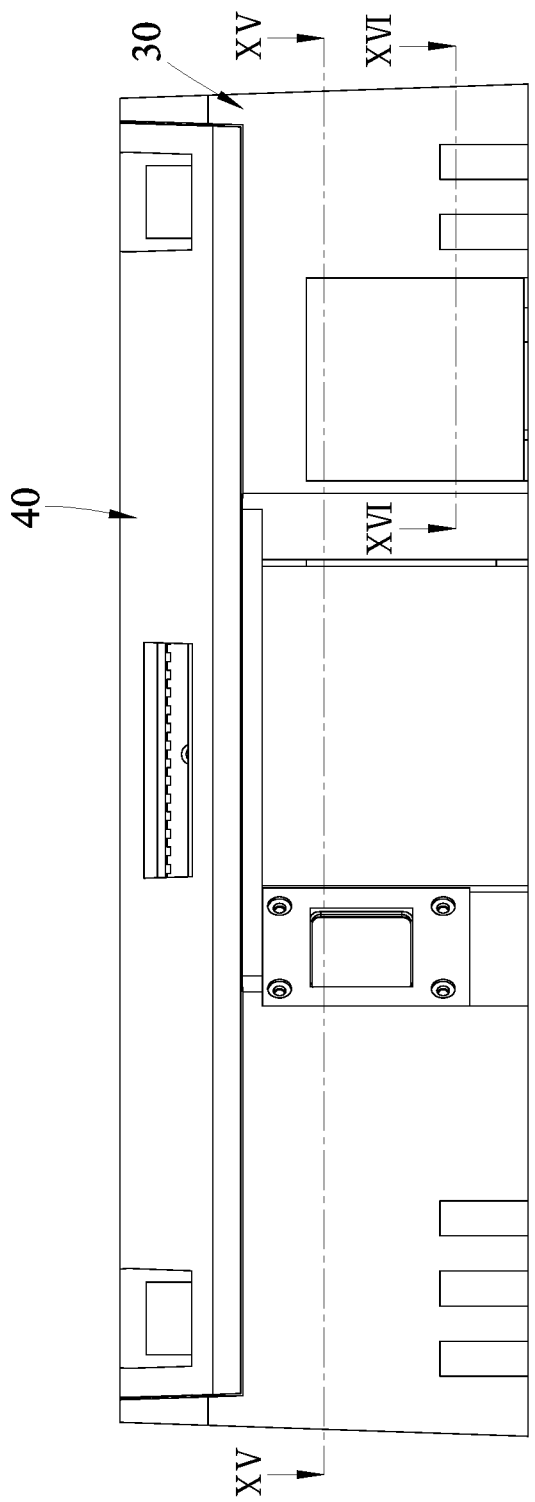
FIG. 13 is a front view illustrating the electronic device of the second embodiment.
Figure 14:
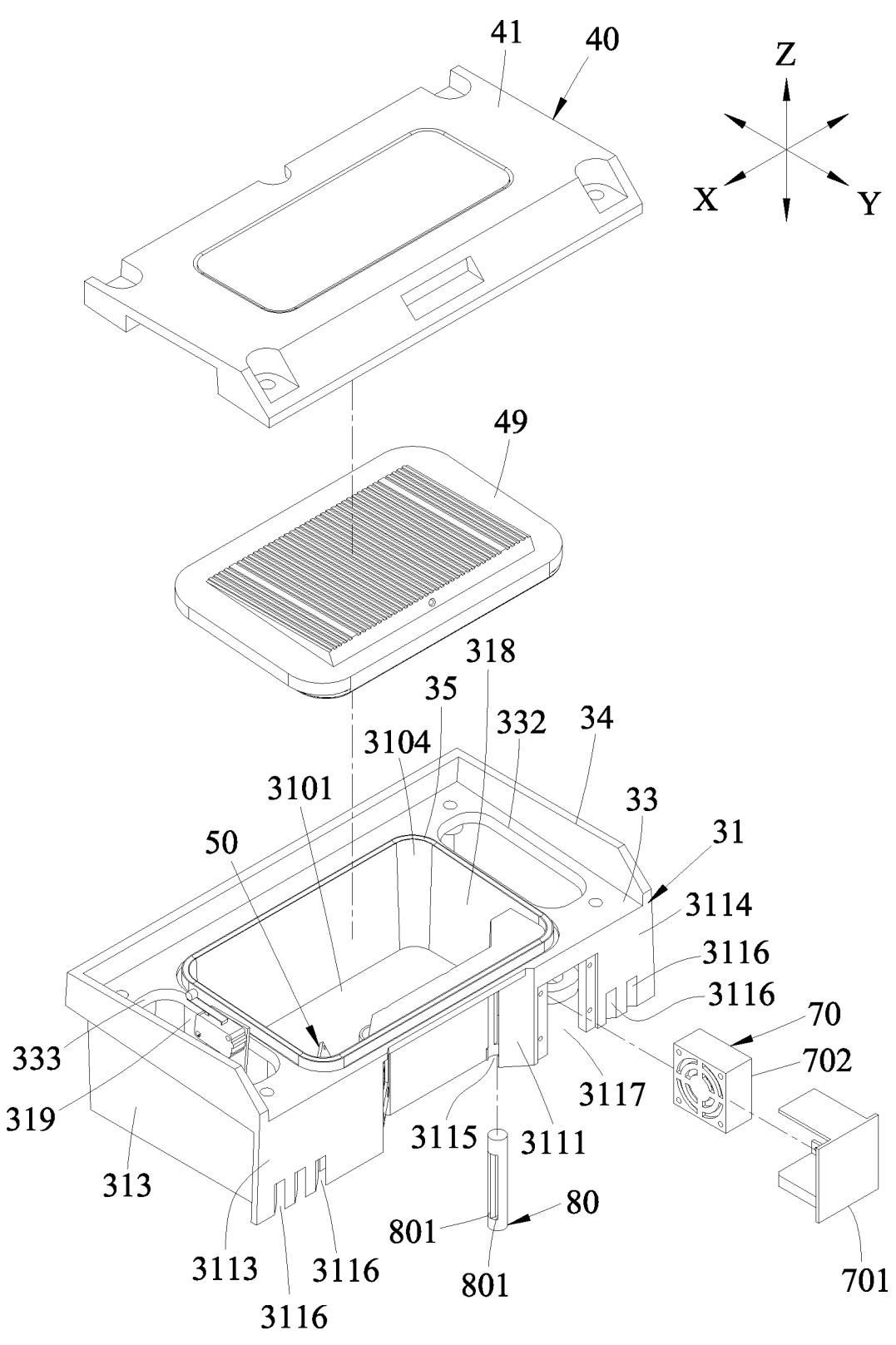
FIG. 14 is an exploded perspective view illustrating the electronic device of the second embodiment.

FIGS. 12 to 14 illustrates a curb system 100 according to a second embodiment of the disclosure, which has a structure generally similar to that of the first embodiment. However, in the second embodiment, the electronic device 20' further includes an air-blowing unit 70 and an air-guiding member 80. Additionally, the electronic device 20' is slightly different in structure from that of the first embodiment.

Figure 15:
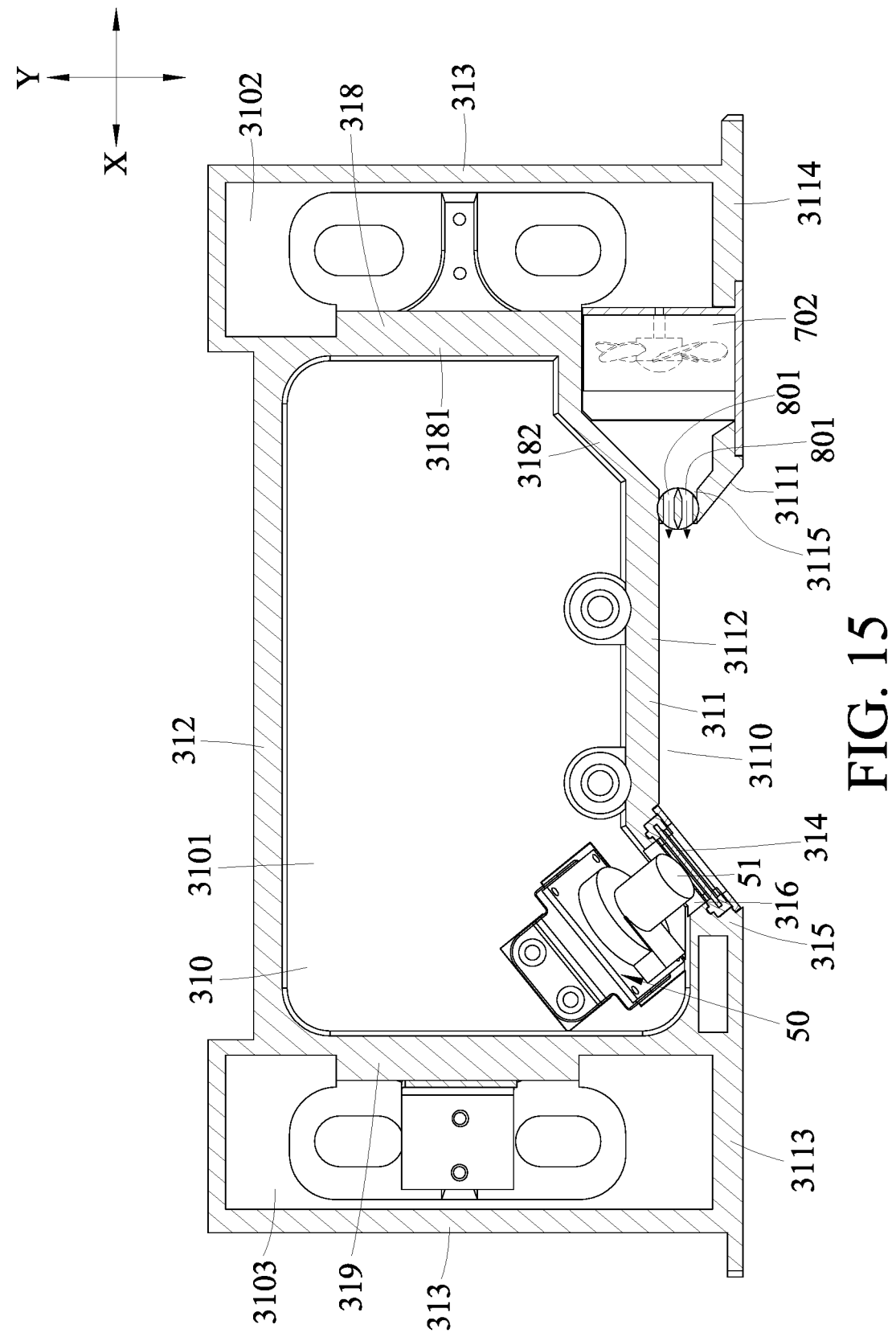
FIG. 15 is a top sectional view taken along line XV-XV from FIG. 13.
Figure 16:
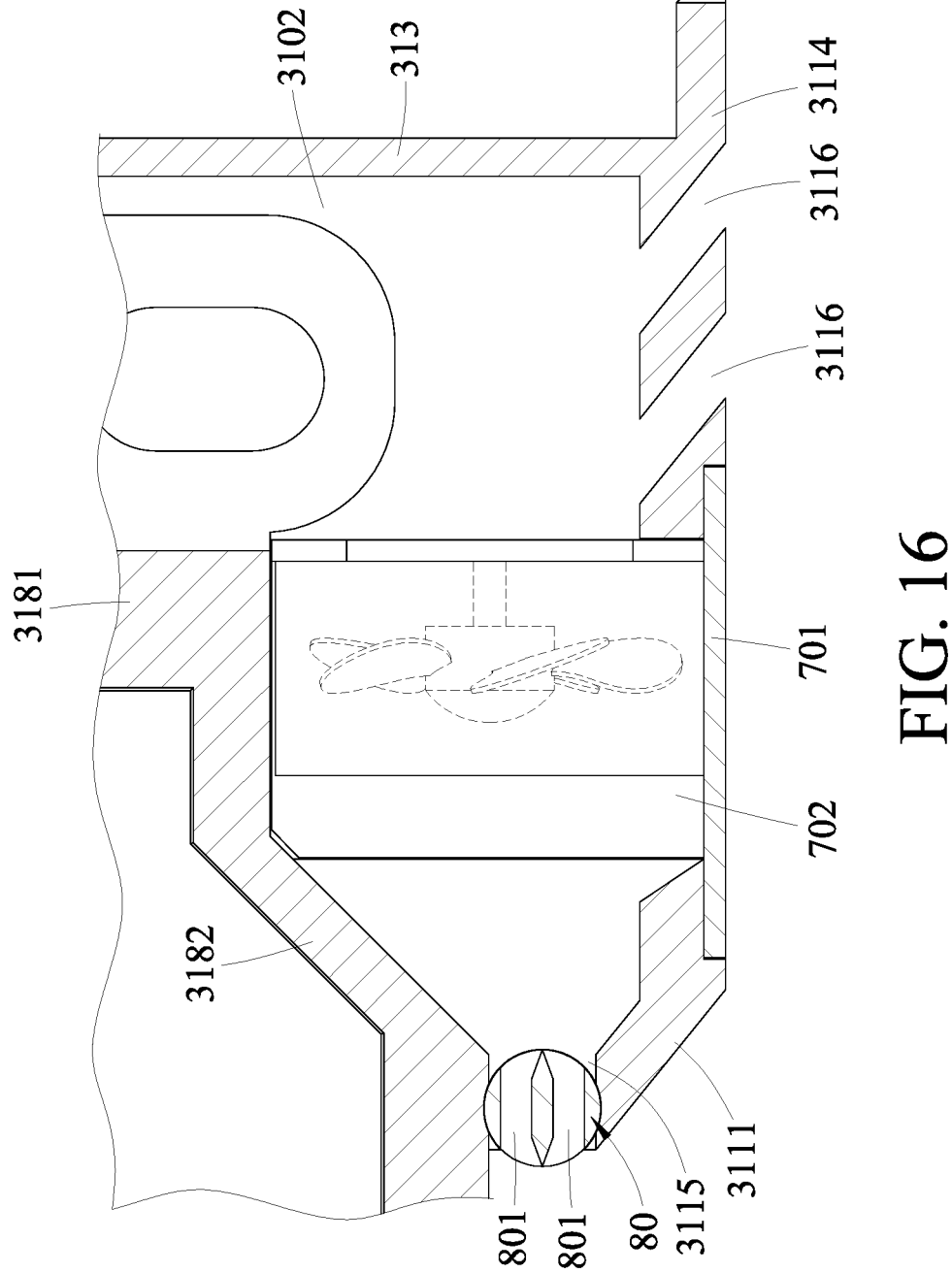
FIG. 16 is an enlarged sectional view taken along line XVI-XVI from FIG. 13 illustrating an installation seat, a fan, and an air-guiding member of the electronic device of the second embodiment.

Referring to FIGS. 14 to 16, the front housing wall 311 further has an intermediate wall portion 3112, a first connecting wall portion 3113, and a second connecting wall portion 3114. The intermediate wall portion 3112 interconnects the first slanted wall portion 315 and the second slanted wall portion 3111. The first connecting wall portion 3113 is connected to an end of the first slanted wall portion 315 distal from the intermediate wall portion 3112 and is connected to one of the side housing walls 313. The second connecting wall portion 3114 is connected to an end of the second slanted wall portion 3111 distal from the intermediate wall portion 3112 and is connected to the other one of the side housing walls 313.

The second slanted wall portion 3111 is formed with an air hole 3115 that communicates with the receiving space 310 and that faces the image-capturing opening 316 in the left-right direction (X).

The housing 31 further has a first partition wall 318 and a second partition wall 319. The first partition wall 318 interconnects the front housing wall 311 and the rear housing wall 312. The second partition wall 319 interconnects the first connecting wall portion 3113 of the front housing wall 311 and the rear housing wall 312. The shoulder surrounding wall 33 is connected to the first partition wall 318 and the second partition wall 319, and is further formed with a first opening 332 and a second opening 333. The first opening 332 and the second opening 333 are respectively disposed adjacent to the side housing walls 313.

The first partition wall 318 and the second partition wall 319 are spaced apart from each other in the left-right direction (X) and are disposed between the side housing walls 313. The receiving space 310 is divided by the first partition wall 318 and the second partition wall 319 into a first receiving region 3102, a second receiving region 3103, and an intermediate region 3101 disposed between the first receiving region 3102 and the second receiving region 3103.

The first partition wall 318 has a partition portion 3181 and an oblique portion 3182. The partition portion 3181 is connected to the rear housing wall 312. The oblique portion 3182 extends obliquely from an end of the partition portion 3181 distal from the rear housing wall 312 and is connected to the intermediate wall portion 3112. A space between the second slanted wall portion 3111 of the front housing wall 311 and the oblique portion 3182 shrinks toward the air hole 3115.

The intermediate region 3101 is limited between the first partition wall 318 and the second partition wall 319, and has a top opening 3104 surrounded by the protrusion 35. The image-capturing module 50 is disposed in the intermediate region 3101. A waterproof pad 49 covers the top opening 3104 to seal the intermediate region 3101. The waterproof pad 49 is made of a rubber material and is tightly fitted with the protrusion 35, so the intermediate region 3101 may be satisfactorily sealed. As a result, mist or dust is prevented from entering the intermediate region 3101 and from contaminating the image-capturing module 50.

The first receiving region 3102 is limited between the first partition wall 318 and a corresponding one of the side housing walls 313, and communicates with the air hole 3115 and the first opening 332. The second receiving region 3103 is limited between the second partition wall 319 and a corresponding one of the side housing walls 313, and communicates with the second opening 333.

The first slanted wall portion 315, the second slanted wall portion 3111, and the intermediate wall portion 3112 cooperatively define a cavity 3110 that is disposed outside of the housing 31 and that communicates with the image-capturing opening 316 and the air hole 3115.

The first connecting wall portion 3113 of the front housing wall 311 is formed with a plurality of vent passages 3116 that are spaced apart from each other in the left-right direction (X). The second connecting wall portion 3114 of the front housing wall 311 is formed with a plurality of vent passages 3116 that are spaced apart from each other in the left-right direction (X), that are inclined with respect to the front-rear direction (Y), and that communicate with the first receiving region 3102 of the receiving space 310. The first opening 332 of the shoulder surrounding wall 33 communicates with the vent passages 3116 of the second connecting wall portion 3114. In some embodiments, each of the first connecting wall portion 3113 and the second connecting wall portion 3114 may be formed with one vent passage 3116 or more than three vent passages 3116.

The second connecting wall portion 3114 is further formed with an installation opening 3117 that is disposed between the air hole 3115 and a corresponding one of the vent passages 3116 of the second connecting wall portion 3114 distal from the corresponding side housing wall 313.

The air-blowing unit 70 includes an installation seat 701 and a fan 702. The installation seat 701 is removably installed in the first receiving region 3102 of the receiving space 310 through the installation opening 3117. The fan 702 is installed to the installation seat 701, is disposed between the air hole 3115 and the corresponding vent passage 3116 of the second connecting wall portion 3114, and faces the air hole 3115. By virtue of the fan 702 facing the air hole 3115, the air-blowing unit 70 is adapted to blow air toward the image-capturing opening 316 through the air hole 3115. Each of the vent passages 3116 of the second connecting wall portion 3114 is distal from the air hole 3115. The oblique portion 3182 of the first partition wall 318 is disposed between the image-capturing module 50 and the fan 702 of the air-blowing unit 70.

The air-guiding member 80 is disposed in the air hole 3115, is elongated in the top-bottom direction (Z), and has two through channels 801. The through channels 801 communicate with the first receiving region 3102 of the receiving space 310 and are adapted to guide the air blown from the air-blowing unit 70. Specifically, the air-guiding member 80 is rotatable about an axis extending in the top-bottom direction (Z) to change direction of the air blown from the air-blowing unit 70 through the through channels 801.

The electronic device 20' achieves a water-discharging effect as the electronic device 20 of the first embodiment. In this embodiment, rain water seeping through the gap between the control unit 30 and the top cover unit 40 may not only flow out through the front end portion of the shoulder surrounding wall 33, but also flow out the vent passages 3116 through the first opening 332, the second opening 333, the first receiving region 3102, and the second receiving region 3103, thereby further enhancing the water-discharging effect.

In use, the fan 702 is actuated to introduce air outside the housing 31 into the first receiving region 3102 through the vent passages 3116 of the second connecting wall portion 3114, and to blow the air toward the image-capturing opening 316 through the through channels 801 of the air-guiding member 80 disposed in the air hole 3115.

Figure 17:
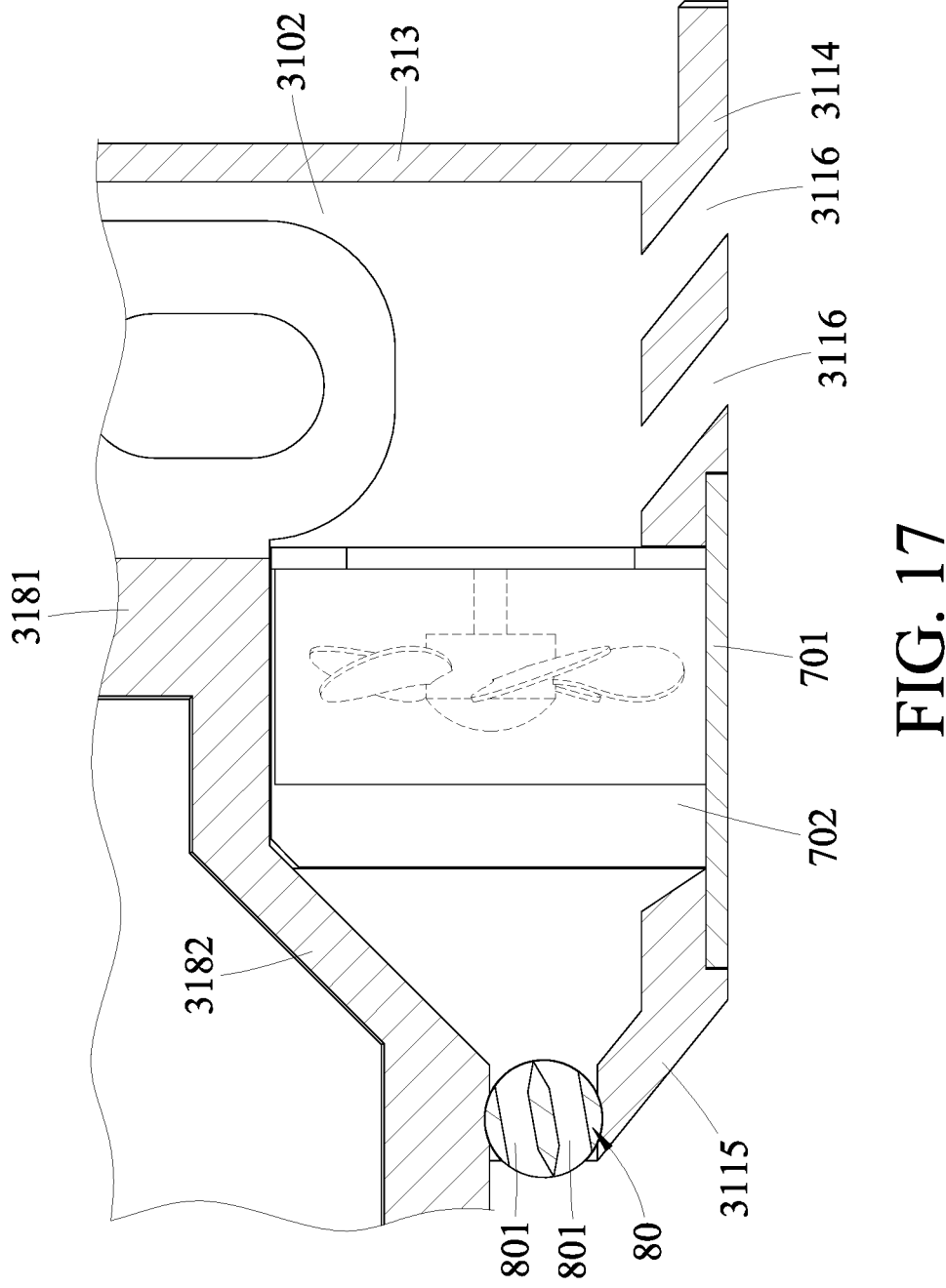
FIG. 17 is view similar to FIG. 16, but illustrating the air-guiding member being rotated relative to the installation seat and the fan.

Referring to FIGS. 16 and 17, rotating the air-guiding member 80 in the air hole 3115 may change the direction of the air blown from the fan 702 through the through channels 801.

Because the space between the second slanted wall portion 3111 of the front housing wall 311 and the oblique portion 3182 shrinks toward the air hole 3115, the air blown from the fan 702 may be concentrated. Because the air-guiding member 80 is rotatable in the air hole 3115, the direction of the air blown from the air-blowing unit 70 through the through channels 801 may be changed. As a result, the transparent plate 314 may be automatically cleaned by the air blown from the air-blowing unit 70 through the through channels 801, thereby reducing laboring maintenance costs. Accordingly, in addition to the water-discharging effect may be satisfactorily achieved by the electronic device 20', the air blown from the fan 702 toward the image-capturing opening 316 through the air hole 3115 may automatically remove dust, leaves, or rain water on the transparent plate 314.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electronic device adapted for mounting to a curb system, said electronic device comprising:
    a control unit including a housing and a drainage structure, said drainage structure having opposite rear and front ends that are arranged in a front-rear direction, said drainage structure including a shoulder surrounding wall that is connected to a top end of said housing, and an outer surrounding wall that extends upwardly from said shoulder surrounding wall, said shoulder surrounding wall having opposite rear and front end portions that are disposed respectively at said rear and front ends of said drainage structure, and being inclined with said front end portion lower than said rear end portion, said outer surrounding wall having two side wall portions that are opposite to each other in a left-right direction perpendicular to the front-rear direction, and a rear wall portion that is disposed at said rear end of said drainage structure and that interconnects said side wall portions, said housing defining a receiving space and having a front housing wall that is disposed forwardly of said receiving space in the front-rear direction, and that has a first slanted wall portion formed with an image-capturing opening, an angle being formed between a central line that is normal to said first slanted wall portion and that extends through said image-capturing opening and a reference line that extends in the left-right direction, and being smaller than 90 degrees;
    a top cover unit being removably connected to said control unit and closing said receiving space; and
    an image-capturing module being disposed in said receiving space, and having a lens that is oriented to said image-capturing opening.

2. The electronic device as claimed in claim 1, wherein:
    said shoulder surrounding wall and said outer surrounding wall cooperatively define an accommodating space that has a top open end and a front open end, and that communicates with said receiving space; and
    each of said side wall portions has a front inclined end surface that has a rear end and a front end opposite to and lower than said rear end.

3. The electronic device as claimed in claim 2, wherein said top cover unit is removably disposed in said accommodating space, and includes
    a cover body having
        a top cover wall, and
        a front cover inclined wall that extends obliquely, forwardly, and downwardly from said top cover wall and that is formed with a retaining space, an inclination of said front cover inclined wall conforming to an inclination of said front inclined end surface of each of said side wall portions, and
    a display disposed in said retaining space and flush with said front cover inclined wall.

4. The electronic device as claimed in claim 1, wherein:
    said front housing wall is formed with at least one vent passage; and
    said shoulder surrounding wall is formed with a first opening that communicates with said at least one vent passage.

5. The electronic device as claimed in claim 1, wherein:
said front housing wall further has a second slanted wall
portion, and an intermediate wall portion that intercon-
nects said first slanted wall portion and said second
slanted wall portion;
said second slanted wall portion is formed with an air hole
that communicates with said receiving space and that
faces said image-capturing opening in the left-right
direction;
said first slanted wall portion, said second slanted wall
portion, and said intermediate wall portion coopera-
tively define a cavity that is disposed outside of said
housing and that communicates with said image-cap-
turing opening and said air hole; and
said electronic device further comprises an air-blowing
unit that is disposed in said receiving space and that is
adapted to blow air toward said image-capturing open-
ing through said air hole.

6. The electronic device as claimed in claim 5, wherein:
said electronic device further comprises an air-guiding
member that is disposed in said air hole and that has at
least one through channel, said at least one through
channel communicating with said receiving space and
being adapted to guide the air blown from said air-
blowing unit; and
said air-guiding member is elongated in a top-bottom
direction perpendicular to the left-right direction and
the front-rear direction, and is rotatable about an axis
extending in the top-bottom direction to change direc-
tion of the air blown from said air-blowing unit through
said at least one through channel.

7. The electronic device as claimed in claim 5, wherein:
said air-blowing unit includes a fan facing said air hole of
said second slanted wall portion;
said front housing wall further has
a first connecting wall portion that is connected to an
end of said first slanted wall portion distal from said
intermediate wall portion, and
a second connecting wall portion that is connected to an
end of said second slanted wall portion distal from
said intermediate wall portion; and
said second connecting wall portion is formed with at
least one vent passage that communicates with said
receiving space, and that is inclined with respect to the
front-rear direction, said fan being disposed between
said air hole and said at least one vent passage.

8. The electronic device as claimed in claim 5, wherein
said housing further has
a rear housing wall that is opposite to said front housing
wall, and
a first partition wall that interconnects said front housing
wall and said rear housing wall, and that is disposed
between said image-capturing module and said air-
blowing unit.

9. The electronic device as claimed in claim 8, wherein:
said first partition wall has
a partition portion that is connected to said rear housing
wall, and
an oblique portion that extends obliquely from an end
of said partition portion distal from said rear housing
wall and that is connected to said intermediate wall
portion; and
a space between said second slanted wall portion of said
front housing wall and said oblique portion shrinks
toward said air hole.

10. A curb system, comprising:
said electronic device as claimed in claim 1; and
a curb base unit having
a top base surface and a bottom base surface that are
opposite to each other,
a front base surface and a rear base surface that are
opposite to each other,
two side base surfaces that are spaced apart from each
other in the left-right direction, and
a mounting space that is defined by said top base
surface and that has a front opening and a top
opening;
wherein said electronic device is mounted in said mount-
ing space.

11. The curb system as claimed in claim 10, wherein:
said shoulder surrounding wall projects transversely and
outwardly from said top end of said housing, and said
outer surrounding wall extends upwardly from an outer
periphery of said shoulder surrounding wall;
said mounting space has a first mounting region and a
second mounting region communicating with said first
mounting region;
said top base surface has
a shoulder portion that serves as a bottom boundary of
said first mounting region,
a first surrounding neck portion that extends upwardly
from said shoulder portion and that serves as a lateral
boundary of said first mounting region,
a mounting end portion that serves as a bottom bound-
ary of said second mounting region, and
a second surrounding neck portion that interconnects
said shoulder portion and said mounting end portion
and that serves as a lateral boundary of said second
mounting region;
said shoulder portion, said first surrounding neck portion,
said mounting end portion, and said second surround-
ing neck portion are connected to said front base
surface;
said housing of said electronic device is disposed in said
second mounting region;
said shoulder surrounding wall of said drainage structure
of said electronic device abuts against said shoulder
portion; and
said drainage structure is disposed in said first mounting
region.

12. The curb system as claimed in claim 11, wherein said
top base surface of said curb base unit further has
a flat portion that is connected to said rear base surface
and a top end of said first surrounding neck portion, and
an inclined portion that is connected between said flat
portion and said front base surface, and that has a rear
end and a front end opposite to and lower than said rear
end.

13. The curb system as claimed in claim 11, wherein
said shoulder portion has opposite rear and front end
sections, and is inclined with said front end section
lower than said rear end section; and
an inclined angle of said shoulder portion conforms to an
inclined angle of said shoulder surrounding wall of said
drainage structure of said electronic device.

14. The curb system as claimed in claim 13, wherein:
said shoulder surrounding wall and said outer surrounding
wall cooperatively define an accommodating space that
has a top open end and a front open end, and that
communicates with said receiving space; and
each of said side wall portions has a front inclined end
surface that has a rear end and a front end opposite to
and lower than said rear end.

15. The curb system as claimed in claim 10, wherein:

said front housing wall further has a second slanted wall portion, and an intermediate wall portion that interconnects said first slanted wall portion and said second slanted wall portion;

said second slanted wall portion is formed with an air hole that communicates with said receiving space and that faces said image-capturing opening in the left-right direction;

said first slanted wall portion, said second slanted wall portion, and said intermediate wall portion cooperatively define a cavity that is disposed outside of said housing and that communicates with said image-capturing opening and said air hole; and said electronic device further includes an air-blowing unit that is disposed in said receiving space and that is adapted to blow air toward said image-capturing opening through said air hole.

16. The curb system as claimed in claim 15, wherein:

said electronic device further includes an air-guiding member that is disposed in said air hole and that has at least one through channel, said at least one through channel communicating with said receiving space and being adapted to guide the air blown from said air-blowing unit; and said air-guiding member is elongated in a top-bottom direction perpendicular to the left-right direction and the front-rear direction, and is rotatable about an axis extending in the top-bottom direction to change direction of the air blown from said air-blowing unit through said at least one through channel.

17. The curb system as claimed in claim 15, wherein:

said air-blowing unit includes a fan facing said air hole of said second slanted wall portion;

said front housing wall further has a first connecting wall portion that is connected to an end of said first slanted wall portion distal from said intermediate wall portion, and a second connecting wall portion that is connected to an end of said second slanted wall portion distal from said intermediate wall portion; and said second connecting wall portion is formed with at least one vent passage that communicates with said receiving space, and that is inclined with respect to the front-rear direction, said fan being disposed between said air hole and said at least one vent passage.

18. The curb system as claimed in claim 17, wherein:

said second connecting wall portion is further formed with an installation opening that is disposed between said air hole and said at least one vent passage; and said air-blowing unit further includes an installation seat that is removably installed in said receiving space through said installation opening, said fan being installed to said installation seat.

19. The curb system as claimed in claim 15, wherein said housing further has a rear housing wall that is opposite to said front housing wall, and a first partition wall that interconnects said front housing wall and said rear housing wall, and that is disposed between said image-capturing module and said air-blowing unit.

20. The curb system as claimed in claim 19, wherein said first partition wall has a partition portion that is connected to said rear housing wall, and an oblique portion that extends obliquely from an end of said partition portion distal from said rear housing wall and that is connected to said intermediate wall portion; and a space between said second slanted wall portion of said front housing wall and said oblique portion shrinks toward said air hole.

\* \* \* \* \*